June 18, 1935.  L. GOLDBERG  2,004,983
PLANT SUPPORT
Filed Jan. 18, 1934   2 Sheets-Sheet 2

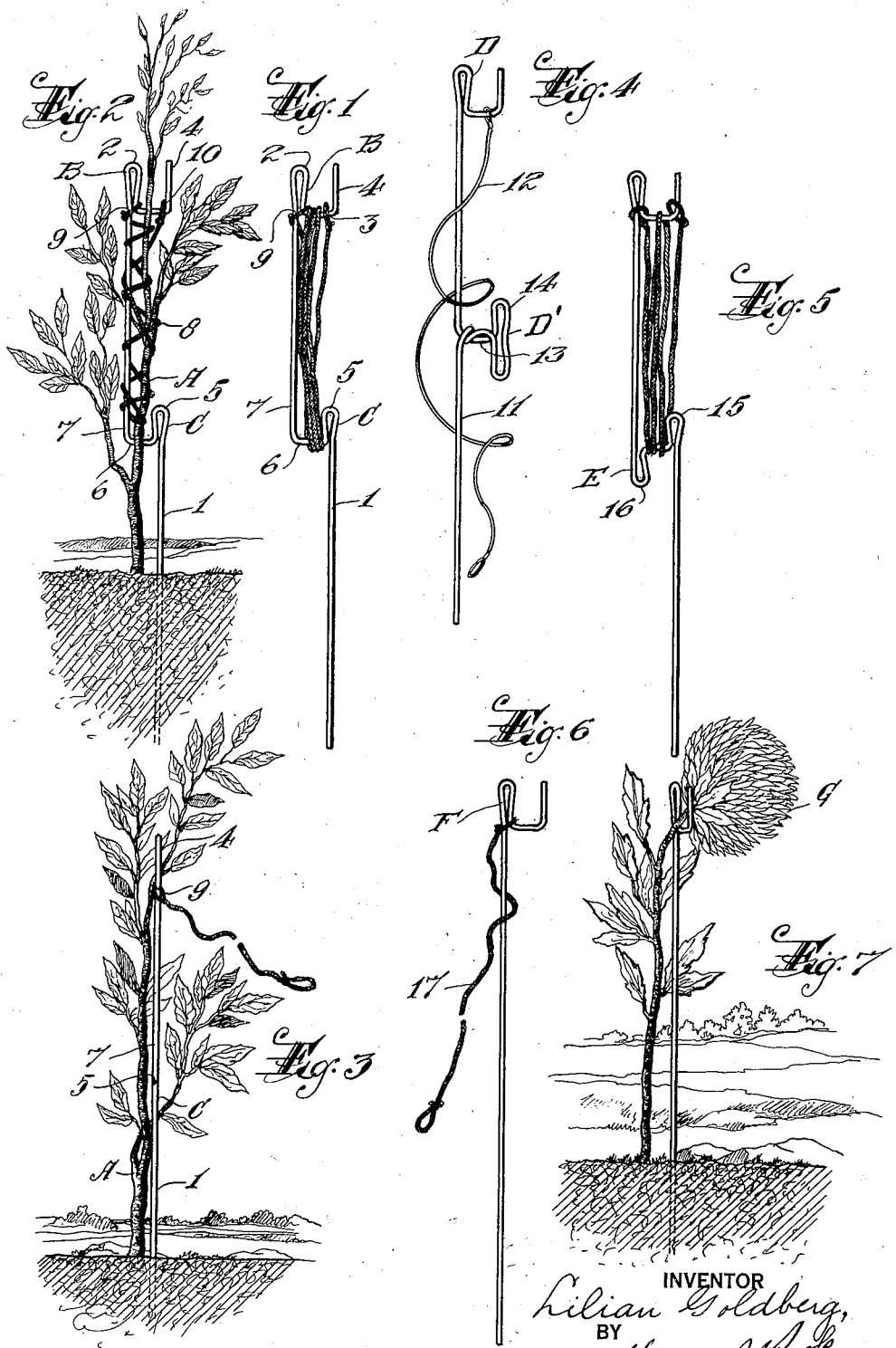

INVENTOR
Lilian Goldberg,
BY
Harry B. Kook,
ATTORNEY

Patented June 18, 1935

2,004,983

UNITED STATES PATENT OFFICE 2,004,983

PLANT SUPPORT

Lilian Goldberg, Madison, N. J.

Application January 18, 1934, Serial No. 707,058

7 Claims. (Cl. 47—47)

This invention relates in general to devices for supporting plants in flower or vegetable gardens, pots or greenhouses, and for supporting cut flowers in vases or other receptacles, one object of the invention being to provide a support of this character which shall be simple and inexpensive in construction, easy and practical to use, pleasing in appearance, and durable so as to withstand repeated use over a long period of time.

Another object is to provide such a plant support which shall comprise a standard to be forced into the earth adjacent the plant, and a flexible strand, such as cord or wire, connected to the standard so that it can be wrapped or wound around the stem of the plant, whereby to support the plant in upright position, said standard also having novel and improved means whereby the cord or wire can be wound on the standard when the support is not in use.

A further object is to provide such a plant support wherein the standard shall have arms or projections to serve both for tying or connecting of the cord or wire to the standard and as a reel for winding the cord neatly and conveniently when the support is out of use.

Other objects are to provide a plant support of this character embodying a novel and improved grip or foot for securely mounting the standard in the earth; to provide a plant support of the general character described wherein said arms or projections can also be utilized for directly supporting the blossom of a plant, for example a peony, especially when the stem of the plant is too weak to effectually support the blossom; and to obtain other advantages and results as will be brought out by the following description.

Referring to the accompanying drawings in which corresponding and like parts are designated throughout the several views by the same reference characters, Figure 1 is a front elevation of a plant support constructed in accordance with my invention, showing the flexible strand wound upon the standard.

Figure 2 is a similar view showing a plant support in use with the flexible strand wound around the plant.

Figure 3 is a side elevation of the support shown in Figure 2 with the flexible strand unwound from the plant.

Figure 4 is a front elevation of a modified form of plant support especially designed for winding of a flexible wire.

Figure 5 is a front elevation of another modification of the plant support with the flexible strand wound on the standard.

Figure 6 is a similar view of still another form of the plant support with the flexible strand unwound.

Figure 7 is a perspective view of the support shown in Figure 6 showing it as supporting the plant.

Figure 8:
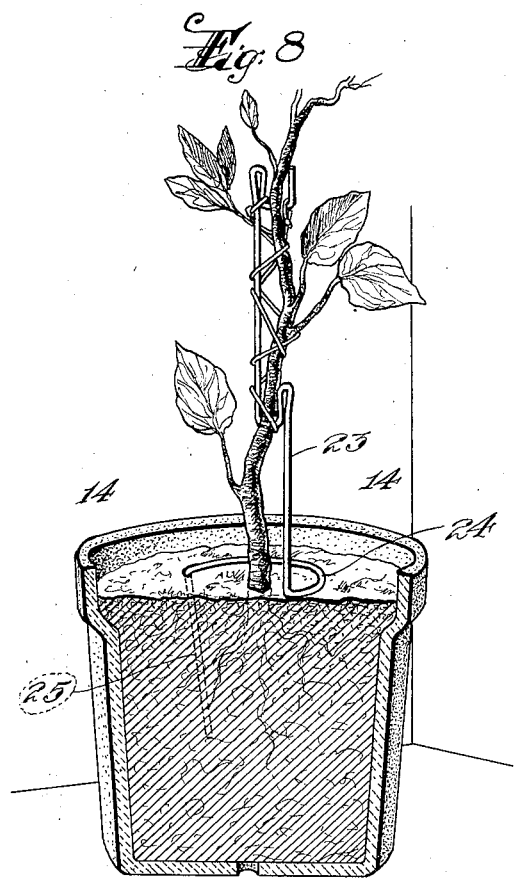
Figure 8 is a perspective view of a form of plant support especially adapted for use with potted plants.
Figure 9:
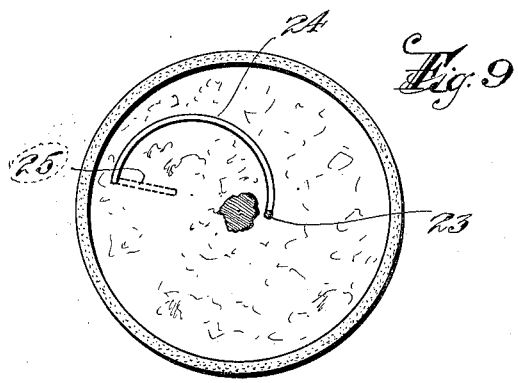
Figure 9 is a horizontal sectional view through the support shown in Figure 8.

Specifically describing the embodiment of the invention illustrated in Figures 1 to 3 inclusive, the plant support includes a standard 1 formed of suitable material, preferably stiff wire. One end of the standard is adapted to be driven into the ground adjacent a plant, as shown in Figure 2, and obviously, the standard will be made of such dimensions and strength as to effectually support the plant in upright position. The other end of the standard has a hooked substantially U-shaped projection B which is formed by bending or returning the end portion of the standard inwardly upon itself as at 2, then bending the end portion laterally as at 3 and finally bending the extremity of the standard to form a portion 4 extending approximately parallel to the standard and in the direction of said end. Intermediate its ends, the standard is formed intermediate its ends with another similarly hooked projection C made by bending the standard upon itself as at 5 and then laterally as at 6 and then into a position approximately parallel with the general axis of the standard as at 7.

A flexible strand 8, which may be of soft cord or wire, has one end connected to the end hooked portion B as at 9, and as shown, the end of the strand may have a loop to be slipped over the hooked portion. In use of the support this strand is wound around the stem or trunk of a plant A as shown in Figure 2 and the other end of the strand may be connected to either of the hooked projections. As shown, the second end 10 of the strand is connected to the extremity 4 of the end hooked portion. However, said end 10 of the strand might be connected to the portion 5 of the intermediate hooked projection C if desired. The outer ends of the portions 2 and 5 are larger than the inner end to prevent the loop from slipping off.

It will be noted that the U-shaped projections B and C, as shown in Figure 8, are adapted to straddle the stem or a bough of the plant at different points to support and brace the plant and that the standard comprises straight portions extending in opposite directions from the intermediate projection C in laterally offset relation. A particular advantage of this arrangement is that said portions of the standard may be located upon opposite sides of the stem and a bough of a plant whereby the plant may be bound to the support in a manner to exert pressure on the plant in different directions to straighten the same.

When the support is out of use, the strand may be wound over the two hooked projections which form a reel for the strand as shown in Figure 1.

A modification of the invention is shown in Figure 4 where the standard 11 is formed at one end with a hooked projection D identical with the projection B to which one end of a flexible strand, such as fine wire 12, may be connected. Intermediate its ends the standard is formed with another hooked projection D' which can be conveniently made by looping the wire of the standard and then twisting it to form in effect a T-shaped projection the stem 13 of which projects laterally from the standard and the head 14 of which is disposed in substantially the same plane as the standard. This form of the support is used in the same manner shown in Figures 1 to 3 inclusive, the essential difference being that the T-shaped projection D' provides in the head 14, a keeper for preventing the wire from slipping from the projection when the wire is wound on the standard.

Figure 5 shows another form of the support wherein the intermediate hooked projection E is formed by successively bending the standard in reverse directions as shown at 15 and 16. This form of the support may be used in the same way as the form shown in Figure 4.

In Figure 6 is shown the simplest form of the support wherein the standard has only a single hooked projection F at one end to which the flexible strand 17 is connected. The strand may be wound wholly upon the projection F when the support is not in use.

It will thus be seen that in the forms of the invention shown in Figures 1 to 6 inclusive, the laterally disposed intermediate portion 3 of the hooked projection serves as the core of a reel, while the returned portion 2 and the end portion 4 serve as end stops for the core to hold the strand wound on the intermediate portion 3.

In all of the forms so far illustrated and described, the outermost hooked projection B may serve as a rest for a blossom G on the stem of a plant as shown in Figure 7. This is especially desirable where the blossom, for example, a peony blossom, is too heavy to be effectually supported by the stem. The main trunk or stem of the plant may be supported by the standard and flexible strand exactly as in the forms of the support heretofore described.

In some instances it may be desirable to provide a more stable grip of the plant support with the earth, and accordingly I contemplate providing a special ground grip for the support. One form of this ground grip is shown in Figure 8 where the standard 23 of the support is formed intermediate its ends with a looped lateral extension 24 which is disposed in a plane approximately perpendicular to one end of the standard. The first end 25 of the standard is preferably disposed with its axis converging toward the axis of the other end portion of the standard in the direction of the extremity of the standard. In use, the end portion 25 of the standard is driven into the ground so that the lateral extension or foot 24 may rest upon the earth, after which the flexible strand may be wound around the plant as hereinbefore described. The plant support is so related to the plant that strains on the upper portion of the plant support are directed in approximately the common plane of the end portion of the standard and transversely of the loop extension 24. This structure reduces to the minimum the tendency of the plant support to bend under the weight of the plant, especially at the ground line, and with the end portion 25 of the standard converging inwardly toward the axis of the other portion of the standard, great resistance to pulling of the first-mentioned end portion out of the earth, is ensured. Where the plant support is used with a potted plant, the extension foot 24 may be covered with a layer of dirt so as to conceal the foot.

Obviously, the support may be made in great variety of sizes for use with different sizes of plants, and the supports being made of wire or other durable material, can be maintained neat in appearance and will withstand repeated use over long periods of time. The supports will be inconspicuous when in use, and pleasing in appearance; and the supports are inexpensive in construction and easy to use. The flexible strands can be neatly and conveniently preserved from year to year and by being wound upon the supports are prevented from becoming knotted or tangled. Also, more or less of the strand may be conveniently used as desired without the necessity for cutting of the strand. If desired, a plurality of the supports may be arranged in a row, for example along a walk or border, the strand of one support being connected to the next adjacent support so as to form a continuous rest for the plants on the border.

While I have shown and described my invention as embodied in certain details of construction is should be understood that this is primarily for illustrating the principles of the invention and that many modifications and changes may be made in the structure without departing from the spirit or scope of the invention.

Having thus described my invention, what I claim is:

1. A plant support for the stem or a bough of a plant, to be erected adjacent the plant, and a flexible strand connected to the support to be wound around said plant, said support comprising a wire standard having U-shaped projections disposed laterally thereof and spaced apart longitudinally of the same to straddle said stem or a bough at different points, respectively, and to serve as a reel for winding up said strand when the support is not in use.

2. A plant support comprising a wire standard to be erected adjacent a plant and having a projection at one end including a portion returned upon said standard and other contiguous integral portions one disposed laterally of the standard and another extending in the direction of said end, and a flexible strand to be wound around said plant and having one end connected to said projection, an intermediate portion of said standard having another projection disposed at the same side of said standard whereby the other end of said strand can be connected to the second projection and said projections together serve as a reel for winding said strand when the support is not in use.

3. A support for a plant to be erected in the ground in an upright position adjacent said plant, and a flexible strand having an end connected to the support and to be wound around said plant and support to bind the plant to said support, said support comprising a wire standard having a ground engaging end and a free end, a lateral U-shaped projection intermediate said ends and a similar projection at its free end for straddling the stem or a bough of the plant at different points, respectively, to support and brace the same, and straight portions extending in opposite directions from said intermediate projection to said ground engaging and free ends respectively, said portions being laterally offset from each other for location upon opposite sides of said stem or bough of the plant whereby said stem or bough may be bound to the support by said strand to exert pressure on the same in difficult directions to straighten said plant.

4. A plant support comprising a wire standard to be erected adjacent a plant and having a projection at one end including a portion returned upon said standard and other continuous integral portions one disposed laterally of the standard and another extending in the direction of said end, the returned portion forming together with said standard an enlarged end on the latter, and a flexible strand having an end connected to the standard intermediate said enlarged end and said laterally disposed portion whereby said strand is prevented from slipping off said standard or downwardly along the same, an intermediate portion of the standard having another projection disposed at the same side of said standard whereby the other end of asid strand can be connected to the second projection and said projections together serve as a reel for winding the strand when the support is not in use.

5. A plant support comprising a wire standard to be erected adjacent a plant and having a projection at one end including a portion returned upon said standard and other continuous integral portions one disposed laterally of the standard and another extending approximately parallel to the standard and in the direction of said end, and a flexible strand to be wound around a plant and having one end connected to said projection, an intermediate portion of said standard having another projection disposed at the same side of said standard and in substantially a common plane with the first-mentioned projection, whereby the other end of said strand can be connected to the second projection and said projections together serve as a reel for winding said strand when the support is not in use.

6. A plant support comprising a wire standard to be erected adjacent a plant and having a projection at one end including a portion returned upon said standard, another integral intermediate portion disposed laterally of the standard and another end portion extending approximately parallel to the standard and in the direction of said end, and a flexible strand to be wound around a plant and having one end connected to said projection, said laterally disposed intermediate portion, said returned portion and said end portion of said projection forming a reel upon which said strand may be wound and held against displacement.

7. The plant support set forth in claim 6 wherein the other end of said strand has a loop to slip over either said returned portion or said end portion after the strand has been wound about a plant or after winding of the strand on said intermediate portion.

LILIAN GOLDBERG.